Dec. 4, 1956   D. H. BONSTEEL   2,772,841
AIRCRAFT TRIM CONTROL
Filed April 28, 1955   2 Sheets-Sheet 1
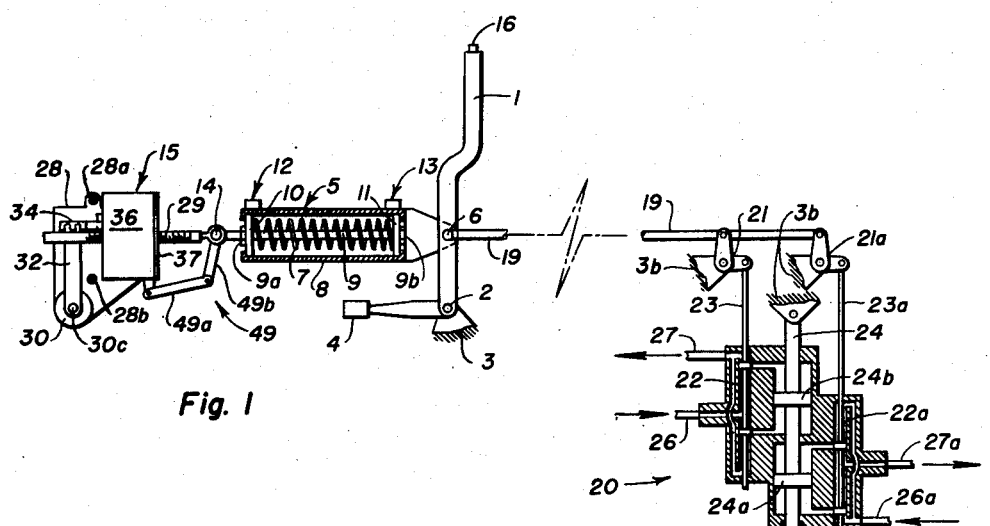
Fig. 1
Fig. 2
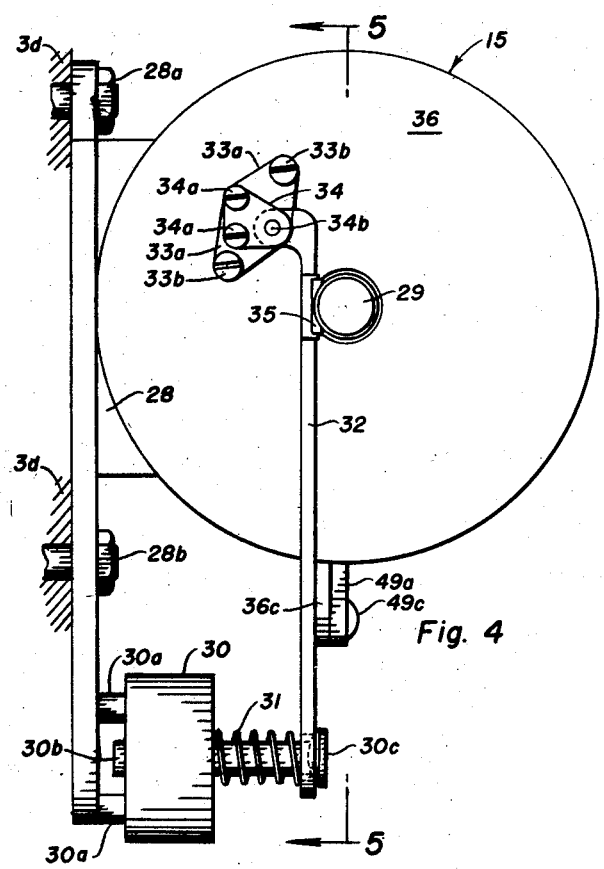
Fig. 4
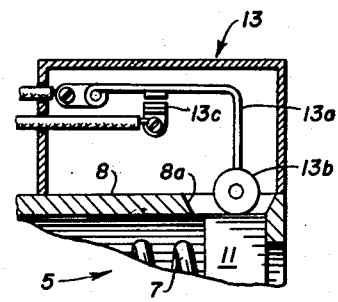
Donald H. Bonsteel
INVENTOR.
BY *James W. Clark*
ATTORNEY.

Dec. 4, 1956    D. H. BONSTEEL    2,772,841
AIRCRAFT TRIM CONTROL
Filed April 28, 1955    2 Sheets-Sheet 2
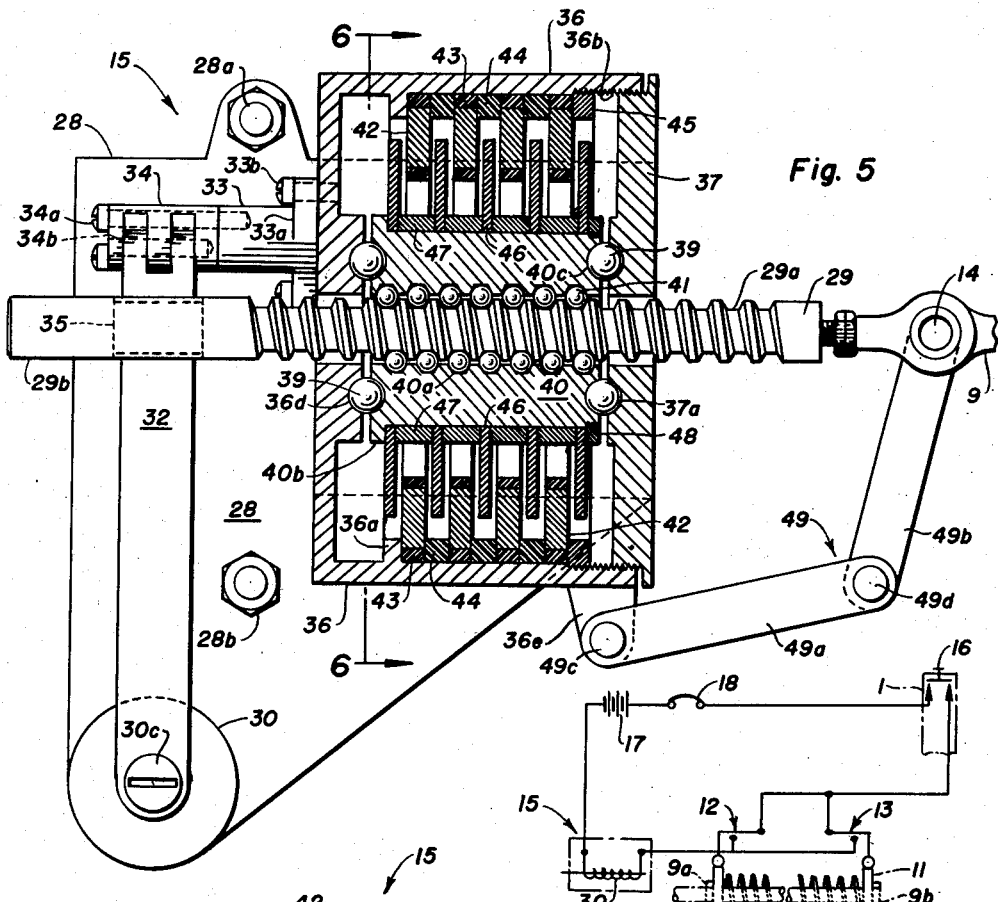
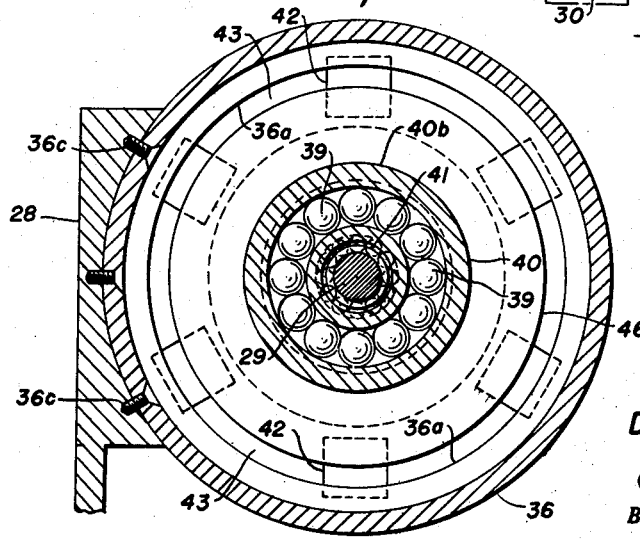
Donald H. Bonsteel
INVENTOR.
ATTORNEY.

United States Patent Office 2,772,841
Patented Dec. 4, 1956

2,772,841

AIRCRAFT TRIM CONTROL

Donald H. Bonsteel, Inglewood, Calif., assignor to North American Aviation, Inc.

Application April 28, 1955, Serial No. 504,487

5 Claims. (Cl. 244—83)

The present invention relates to aircraft controls and more particularly to improved mechanism for accomplishing the trimming of the control surfaces and other components of an airplane or the like.

In the operation of modern high speed aircraft, it is frequently necessary to adjust the controls of the aircraft in flight in order that it be properly balanced or trimmed such that it will maintain a desired attitude or course. The conditions which affect the trim of the airplane are due to a number of factors normally encountered in flight due to variations in loads, power plant output, aircraft maneuvers and other causes. They frequently require the immediate attention of the pilot, who in single-place aircraft usually has a multitude of other duties. Trimming means such as adjustable surfaces, stabilizers, control surfaces or trailing edge trim tabs with appropriate adjusting mechanisms have been provided heretofore to relieve the pilot from the necessity of the continual application of control forces to maintain a given course or attitude of the airplane. Where such trim facilities are applied to high speed aircraft, they are frequently associated with powered or servomotor actuation of the component to be adjusted, and since the control system is usually irreversible in that the aerodynamic forces are not transmitted directly to the control stick or its equivalent, a certain amount of artificial feel must be provided.

The present invention is directed to an improvement in prior artificial feel control systems of high speed aircraft which have been designed to give the pilot full control of the pitch and lateral control surfaces without the necessity of exerting extreme forces at the control stick. These prior artificial feel control systems are usually irreversible, i. e., aerodynamic forces acting on the stabilizer, elevator or aileron surfaces are not transmitted back to the control stick. Such existing artificial feel control systems frequently consist of the control stick with an attached bobweight, a stick bungee with its stick centering springs, the servomotor unit for the surface and a trim actuator device which serves to move the neutral or ground point of the artificial feel bungee.

During level flight in such prior artificial feel control systems, when the pilot has to maintain a certain force at the control stick and he desires to reduce this force to zero, he usually moves a two-way trim switch button on the control stick for the desired trim direction. This serves to close the circuit to the reversing trim actuator motor and causes movement of the trim device, and thereby the bungee, toward its zero force position. If trimming in the opposite direction is required, the trim button is moved in the corresponding direction, thus reversing the action of the trim device. Such prior systems have several inherent disadvantages, principally in that the pilot has to be able to feel when the stick force has become zero and, at that precise moment, to disengage the trim button to prevent trim overshoot or overcontrol.

The present invention is directed to an improvement in such systems by utilizing the bungee spring forces to effect the desired trimming action with improved means for damping and controlling the rate of change of the bungee setting. In co-pending application Serial No. 475,213 of the present applicant and Carl C. Starbeck for "Aircraft Trim Control," filed December 14, 1954, there is disclosed a trim control system incorporating an improved adjustable governor type component. While several similar trim devices have been proposed and used heretofore in order that the trimming action be accomplished at reasonable and controlled speeds, they have most frequently been utilized in conjunction with motor-driven trim devices which have been proportionately heavy and more complicated in construction and control. The presently improved mechanism in a preferred form embodies an eddy current damper. The present mechanism accordingly obviates the necessity of a powered or motor drive for the trim device and one of its primary objectives is to provide such a mechanism which is simple and foolproof in operation and lighter in weight and less complicated than such prior devices. It is also an object to provide means for controlling or limiting the rate of change of bungee setting by making the same subject to the damping and retarding effects of the eddy current device. It is also an object of the present invention to provide such a system of an improved type in which there is always adequate feel in the controls. These and other advantages and objects will become apparent to those skilled in the art from a study of the following description and the accompanying drawings, forming a part hereof, in which:

Fig. 1 is a diagrammatic general arrangement view of the improved damper trim device applied to the trim control for the horizontal stabilizer of an aircraft;

Fig. 2 is a detail view of one of the sensing switches carried upon the bungee unit of Figs. 1 and 3;

Fig. 3 is a schematic wiring diagram of the electric circuit for the manual control of the trim device from the control stick as conditioned by the spring bungee position;

Fig. 4 is a detailed end view of the improved damper type trim device;

Fig. 5 is a partly sectioned side elevational view of the same as taken along the lines 5—5 of Fig. 4;

Fig. 6 is a transverse sectional view of the trim device as taken along the lines 6—6 of Fig. 5;

Referring now to Fig. 1, there is diagrammatically illustrated a preferred form of the improved damper type trim device as applied, for example, to the horizontal stabilizer of an aircraft, although it will be understood that it may be applied to any other powered control surface or component which may require trim adjustment in flight. The control system comprises essentially the control stick 1, which is pivotally attached to the bungee spring unit 5, which is adjustably connected by the improved trim device 15 to fixed aircraft structure, and the control stick is connected by suitable operating mechanism to the hydraulic type servomotor 20 for adjustment of the surface component 25. As indicated above, while the invention is shown and described in connection with an adjustable stabilizer, it will be understood that it is equally applicable to the ailerons, elevator trim tabs or any other adjustable component which is used for trimming the airplane. In the example which has been illustrated, the entire horizontal tail surface is used as a control surface and consists essentially of two sections, a forward section 25 which is the stabilizer, and a rear or elevator section (not shown). The stabilizer is preferably pivoted at its rear spar and is positioned by the hydraulic cylinder 20 which may be attached at its front spar. The elevator in the present installation is preferably connected to the stabilizer by a linkage arrangement and moves in a manner similar to that of a reverse boost tab.

The control stick 1 is pivotally mounted at the torque tube 2 supported from the fixed aircraft structure 3, and the stick has attached thereto the bobweight 4, the function of which is to increase the stick force during normal acceleration. While in level flight, the effect of the bobweight is cancelled by the elastic bungee spring or other force producing means in the unit 5. The stick 1 is pivotally connected to the bungee unit 5 at the pivot 6 and this unit contains a compression spring 7 within its tubular housing 8 which serves to return the stick to the trimmed position. The ends of the casing 8 are open but have lipped portions which retain the end discs or plates 10 and 11 which are each slidably mounted upon the bungee rod 9 to and from which forces are transmitted by means of the nuts 9a and 9b which are secured to the rod. It will be understood that as the casing 8 of the bungee unit 5 is moved toward the left in Fig. 1, the end disc 11 will be caused to move to the left therewith. Inasmuch as the opposite end disc 10 is held fixed by the nut 9a mounted on the rod 9 which is also held fixed, the spring 7 will be compressed due to the relative telescoping of the casing 8 over the rod 9 causing the end plate 10 to be moved inwardly relative to the adjacent ends of the casing 8. Position sensing switches 12 and 13 are mounted upon the casing 8 and are normally each in the open position when the bungee unit 5 is also in the normal unloaded condition in which both end plates 10 and 11 bear against the respective ends of the casing 8.

The bungee rod 9 is pivotally connected at 14 to the damper type trim device 15 which is securely mounted upon the fixed aircraft structure at 3d by means of the mounting bolts 28a and 28b and will be described in detail below in connection with Figs. 4, 5 and 6. The control stick 1 is provided with a stick switch 16, which it will be noted from Fig. 3, is normally open, but by being depressed can be placed in circuit with the switches 12 and 13 on the bungee unit 5 as well as with the battery or other source of electrical energy 17 and the thermal circuit breaker 18, for the actuation of the solenoid 30 in the trim device unit 15. It will be noted from Fig. 2 that relative movement of the components of the bungee unit 5 causing compression of the spring 7 results in relative movement of either of the end discs 10 or 11, depending upon the direction of movement, thereby closing the corresponding switch 12 or 13 to condition the system for closing of the stick switch 16 whenever found desirable by the pilot. For the sake of clarity, while the switches 12 and 13, and 16, as well as the solenoid 30 have been generally indicated in Fig. 1, the wiring has been omitted from that figure and may be referred to in Fig. 3.

The control stick 1 is also pivotally connected at 6 to the push-pull rod 19 which extends aft for the control and movement of the hydraulic servomotor 20. The latter is arranged for both normal and emergency system operation and accordingly dual bell-cranks 21 and 21a are pivotally connected to the aft portion of the rod 19 and are rockably mounted upon adjacent fixed aircraft structure 3b. The control valve for normal operation of the servomotor 20 is indicated at 22 and the emergency control valve is shown at 22a. The normal valve has its sliding piston valve 23 pivotally connected to the bell-crank 21 and the emergency valve has its sliding piston valve 23a pivotally connected to the bell-crank 21a. The casing of the servomotor 20 is pivotally connected to the stabilizer 25 at the pivot 25a, and its piston rod 24 is pivotally connected above the motor to the fixed aircraft structure 3b. The stabilizer 25 is of the "allmovable" type and is pivoted to fixed structure 3c at the pivot 25b. The piston rod 24 has the piston 24a fixed thereto for emergency operation and the piston 24b is also fixed to the same piston rod for normal operation. The normal control valve 22 is supplied by hydraulic fluid under pressure through the line 26, and is provided with a return line 27; and the emergency control valve 22a is provided with emergency system pressure through the line 26a with a suitable return line 27a through which the fluid merely by-passes during normal operation of the servomotor.

Reference is now made to Figs. 4, 5 and 6 for a detailed description of the improved damper type trim device 15. This trim device may preferably be constructed upon a mounting frame or case 28 which is suitably apertured for the mounting bolts 28a and 28b by which it is mounted upon the aircraft structure 3d as indicated in Fig. 4. The trim device 15 is connected to the bungee rod 9 at the pivot terminal 14 by means of the elongated threaded screw rod or jack screw 29. An intermediate portion of the screw rod or jack screw 29 is provided with the helical thread 29a and its opposite or free portion 29b is normally retained in its fixed position in the axial or rectilinear sense by means of a brake system selectively actuated by the electrical solenoid 30.

The solenoid 30 is fixedly mounted upon the lower portion of the frame 28 by means of the attachment portions 30a and its movable plunger 30b is attached by means of the attachment head 30c to the free arm of the lower or free end of the brake lever 32. A compression type coil spring 31 is interposed between the casing of the solenoid 30 and the lower end of the brake lever 32 to maintain the brake lever in the engaged position at all times other than when the solenoid is energized and the movement of the plunger 30b compresses the solenoid return spring 31 and thereby releases the pressure exerted by the brake lever 32. The screw shaft braking system also includes the brake arm support 33 which is supported from the cylindrical damper housing 36 by means of the flange 33a and the screws 33b and carries a hinge block member 34 attached to the support fitting 33 by means of the attachment screws 34a and mounting a pivot 34b for the brake arm 32. The latter has attached adjacent its pivotally mounted portion a brake pad 35 which is adapted to engage an arcuate portion of the adjacent cylindrical surface of the screw rod terminal 29b.

The damper support member 28 has an arcuately formed portion to receive the adjacent cylindrical surface of the damper housing 36 which is attached thereto by means of the screws 36c. The housing 36 is generally cylindrical in shape, having a central bore to clear the screw rod 29, with an inwardly extending shoulder 36a adjacent its closed end and having its open end threaded at 36b. The open end of the housing 36 is closed by the circular end plate 37 which is suitably threaded at its periphery to engage the threads 36b and is similarly centrally apertured to provide clearance for the screw rod 29. The apertured end of the casing or housing 36, as well as the end plate 37, are provided with thickened hub portions grooved at 36d and 37a, respectively, to provide ball races for the anti-friction steel balls forming end bearings for the internal screw nut or rotatable component 40 of the damper device, which has corresponding ball races 40c formed therein.

The eddy current damper unit 36 is formed by a series of annular permanent magnets 42 which are preferably supported within the plastic annular rings 43, one of which is placed against the inwardly extending shoulder 36a of the housing and the successive plastic rings 43, with their imbedded magnets 42, are disposed internally within the housing with intermediate spacers 44 to provide the requisite spacing between the individual magnets 42. The entire assembly of magnet rings 42—43 is secured in position by means of the threaded locking ring 45 which engages the internal threads 36b of the housing 36.

The rotary component or screw nut element 40 is internally bored and threaded at 40a to receive the circulating screw nut balls 41 to thereby provide the threaded relationship between the rotationally movable screw nut component 40 and the axially movable screw rod component 29 in an anti-friction ball-bearing arrangement with a minimum of resulting friction. The screw nut 40 is provided with a shouldered end 40b against which the first of a series of annular aluminum discs 46 is placed, and spacers 47 are provided between each of the remaining successive discs 46 to provide the requisite spacing to bring the respective discs 46 centrally between each pair of magnets 42, and at like distances at each end of the end magnets in the series. The series of magnets and spacers are retained in the desired relationship by the lock ring 48 which threadedly engages the screw nut hub portion 40.

An apertured lug 36e is formed on the lower side of the housing 36 to which the anti-torque or nutcracker linkage 49 is pivotally interconnected between the translatable pivot 14 and the housing lugs 36e. It will be recalled that the bungee rod 9 is pivotally connected to the adjustable terminal fitting on the screw rod 29 at the pivot 14, and connection is also made to the pivot 14 by the upper link 49b of the nutcracker link assembly 49, which link 49b in turn is pivotally connected at the intermediate pivot 49d to the lower nutcracker link 49a, which in turn is pivotally connected to the depending lug 36e by means of the pivot 49c. The nutcracker assembly 49 will accordingly permit axial or rectilinear motion of the screw rod 29 when its solenoid-actuated brake is released and in accordance with the corresponding axial or rectilinear movement of the bungee rod 9. At the same time, the nutcracker assembly 49 will prevent rotational movement of the screw rod 29, which rotation would prevent the imparting of the desired rotary movement to the screw nut 40 by the axial movement of the screw rod 29.

The arrangement of the adjacent permanent magnets 42 provides a magnetic field within which the aluminum discs 46 are required to rotate as the screw nut 40 is rotated. The aluminum discs 46, in cutting the lines of force of the magnetic field, create eddy currents and the accompanying electro-magnetic reaction provides a damping effect which slows the rate of rotation of the screw nut 40. The resulting axial or rectilinear rate of movement of the screw rod or shaft 29 is correspondingly reduced or slowed down to a predetermined or controlled rate.

The operation of the improved system is as follows: Let us assume that a condition has developed in the aircraft which requires that the nose of the stabilizer 25 be moved downwardly, i. e., rotated in the counterclockwise direction about its pivotal mounting 25b and that the stick 1 is required to be drawn rearwardly to a predetermined point against the opposition of the bungee spring 7 in order to cause the nose of the aircraft to rise to maintain the aircraft upon its predetermined course. Rather than continue the tiring operation of the pilot's continued application of control force to the stick 1, it is only necessary that the stick switch button 16 be depressed to close the electrical circuit and energize the solenoid 30. Inasmuch as the stick 1 has been drawn rearwardly, to a predetermined distance to provide the desired trim of the airplane, the casing 8 of the bungee unit 5 will have been moved with the stick causing the disc 11 to be drawn farther inwardly into the casing 8, or toward the left as viewed in Fig. 2 showing the disc 11 at its end position, thereby permitting the switch roller 13b on the arm 13a to drop into the opening 8a causing contact to be made at the switch 13c, thereby closing the switch unit 13. This serves to close the circuit thereby energizing the solenoid 30 which overcomes the effect of the spring 31 to rotate the brake lever 32 and withdraw the same from the screw rod terminal 29b from which the brake pad 35 is disengaged. The screw rod 29 would, accordingly, be drawn toward the stick 1 by the action of the spring 7 within the bungee unit 5 but due to its threaded engagement with the screw nut assembly 40, rotation is initially imparted to the latter due to the axial movement of the screw rod. The speed of rotation of the screw nut 40 is dampened and retarded by the action of the aluminum discs 46 in rotating through the fields of the permanent magnets 42. The foregoing damping arrangement affects the bungee spring forces applied to the trim device and the trim rate, as reflected by the linear rate of travel of the rod 29, is accordingly controlled and governed.

The screw rod 29, and accordingly the rod 9 of the bungee unit, is locked in the adjusted relationship at the new position by release of the switch button 16 on the control stick 1, or by opening of switch 13, and the brake shoe 35 is again applied to the screw rod terminal 29b by de-energization of the solenoid 30 and return of the brake arm 32 by the action of the spring 31. (Conversely, switch 12 would be involved in action in the reverse direction.) The stick load is therefore trimmed to the new zero position, for example, slightly aft of the initial position, by the foregoing release of the brake which permits the respective compression or tension forces developed in the bungee centering spring to move the rod 9 and the connected screw rod 29 until the spring loads are again equalized. This is accomplished without a motor or other power actuated unit and an indicating light may be inserted in the circuit to show when the bungee is again unloaded. The improved trim unit 15 thereby provides a new ground or neutral point for the control system when the brake is re-engaged to lock the screw rod 29 in its new position in respect to the fixed casing of the trim device 15.

The improved system disclosed herein embodying the eddy current dampener type device, also has the advantage that when the artificial feel bungees are located near the servo valves, it is possible to synchronize the aileron trim actuators without a trim cable system as required heretofore. In certain installations, the disclosed microswitches 12 and 13 may either be completely omitted, or other means substituted therefor, and their use with the disclosed dampening device is optional. The arrangement also provides that where desirable one trim button can be used to trim both the ailerons and the horizontal stabilizer simultaneously. Trim over-shoot is also eliminated inasmuch as the trim device is automatically shut-off when the trimmed position is reached. It is possible to increase the trim rate to thereby reduce the time required to accomplish the trim. Previously, in prior devices the trim rate was limited by the over-shoot problem which now is not met with in the improved device. The present semi-automatic trim devices can also be utilized in connection with the autopilot system of the aircraft for automatic control.

Other forms and modifications of the present invention, which will occur to those skilled in the art after reading the preceding description, are intended to come within the scope and spirit of this invention, as more particularly set forth in the appended claims.

I claim:

1. In combination with an airplane control, elastic means operatively connected to said control for exerting opposed restoring forces to said control to urge said control toward a neutral position, trim means including an eddy current damper operatively connected to said elastic means, means for selectively locking and releasing said trim means whereby displacement of said control from said neutral position and selective releasing of said trim means permits dampened movement of said trim means under the influence of the restoring force developed by said elastic means for establishing a new neutral position for said control.

2. In combination with an airplane control, elastic means operatively connected to said control for exerting opposed restoring forces to said control to urge said control toward a neutral position, trim means having an eddy current damper operatively connected to said elastic means, means for selectively locking and releasing said eddy current damper with respect to said trim means whereby displacement of said control from said neutral position and selective releasing of said eddy current damper permits dampened movement of said eddy current damper with respect to said trim means under the influence of the restoring force developed by said elastic means for establishing a new neutral position for said control.

3. In combination with an airplane control, a resilient bungee device operatively connected to said control, a fixedly supported trim device having a screw and nut assembly operatively connected to said bungee device, an eddy current damper opposing rotation of said nut assembly, means for selectively locking and releasing said screw and nut assembly with respect to said trim device whereby displacement of said control causes compression of said resilient bungee device and selective unlocking of said screw and nut assembly permits its dampened movement with respect to said trim device under the influence of the energy stored in said resilient bungee device.

4. In combination with an airplane trim control, a bungee device operatively connected to said control, said bungee device comprising relatively movable members opposed by resilient means, a trim device fixedly supported from the aircraft structure, said trim device having a screw and nut assembly operatively connected to said bungee device and relatively movable with respect to said trim device, an eddy current damper opposing rotation of said nut assembly, means for selectively locking and releasing said screw and nut assembly with respect to said trim device whereby displacement of said control from its neutral position imparting relative movement to said bungee members causes deformation of said resilient means, and selective unlocking of said screw and nut assembly permits its dampened movement with respect to said trim device under the influence of the energy stored in said resilient means to provide a new neutral position for said control at which further displacement in either direction will be resiliently opposed by said bungee device.

5. In a trim device for operation with a bungee spring of a control system, a screw rod operatively connected to the bungee spring, a screw nut operatively engaging said screw rod adapted to rotate upon linear movement of said screw rod by the bungee spring, annular disc means carried by said screw nut, and a casing carrying means for producing a magnetic field whereby rotation of said disc means within the magnetic field of said casing is opposed and linear movement of said screw rod is dampened.

References Cited in the file of this patent
UNITED STATES PATENTS

| | | |
|---|---|---|
| 2,639,108 | Feeney et al. | May 19, 1953 |
| 2,678,179 | Feeney et al. | May 11, 1954 |